US009447986B2

(12) United States Patent
Brisson

(10) Patent No.: US 9,447,986 B2
(45) Date of Patent: Sep. 20, 2016

(54) CUTTING TOOL ASSEMBLY FOR HVAC VENT OPENING AND THE LIKE

(71) Applicant: Timothy J. Brisson, Greenville, SC (US)

(72) Inventor: Timothy J. Brisson, Greenville, SC (US)

( * ) Notice: Subject to any disclaimer, the term of this patent is extended or adjusted under 35 U.S.C. 154(b) by 301 days.

(21) Appl. No.: 14/298,363

(22) Filed: Jun. 6, 2014

(65) Prior Publication Data

US 2014/0366386 A1 Dec. 18, 2014

Related U.S. Application Data

(60) Provisional application No. 61/834,070, filed on Jun. 12, 2013.

(51) Int. Cl.
| | |
|---|---|
| *F24F 13/00* | (2006.01) |
| *F24F 13/02* | (2006.01) |
| *B26F 1/38* | (2006.01) |
| *B28D 1/18* | (2006.01) |
| *B25F 5/02* | (2006.01) |
| *B27C 5/10* | (2006.01) |
| *B23Q 9/00* | (2006.01) |
| *B23Q 35/00* | (2006.01) |

(52) U.S. Cl.
CPC ......... *F24F 13/0245* (2013.01); *B23Q 9/0014* (2013.01); *B23Q 35/00* (2013.01); *B25F 5/02* (2013.01); *B26F 1/3806* (2013.01); *B27C 5/10* (2013.01); *B28D 1/18* (2013.01)

(58) Field of Classification Search
CPC G01B 3/56; G01B 3/563; G01B 2003/1064; G01B 2003/1089; G01B 3/1084; G01B 11/27; G01B 2003/1046; G01B 2003/1074
USPC .......................... 33/562, 566, 638, DIG. 10
See application file for complete search history.

(56) References Cited

U.S. PATENT DOCUMENTS

| | | | |
|---|---|---|---|
| 2,679,269 A | 5/1954 | Waszak | |
| 2,735,455 A | 2/1956 | Forsberg | |
| 3,908,510 A | 9/1975 | Koskolos et al. | |
| 4,306,479 A * | 12/1981 | Eberhardt | B23Q 9/0042 33/479 |
| 4,359,302 A | 11/1982 | Payne | |

(Continued)

*Primary Examiner* — Yaritza Guadalupe-McCall
(74) *Attorney, Agent, or Firm* — Southeast IP Group, LLC.; Thomas L. Moses

(57) ABSTRACT

A power cutting tool for automatically cutting out a vent opening in a substrate such as a floor and the like according to a prescribed pattern is disclosed. The power cutting tool includes a base assembly adapted for support on a surface of said substrate. A track assembly having a track is carried by the base assembly for automatically guiding the movement of the cutting tool. A power cutting tool includes a cutting blade which penetrates the substrate to cut out the vent opening. A drive assembly includes a first drive for operating the cutting blade, and a second drive engaging the track for automatically moving the power cutting tool along the track while simultaneously operating the cutting blade to cut out the vent opening pattern in the substrate.

30 Claims, 6 Drawing Sheets

(56) References Cited

U.S. PATENT DOCUMENTS

| | | | |
|---|---|---|---|
| 4,620,407 A | 11/1986 | Schmid | |
| 4,947,910 A | 8/1990 | Reneau | |
| 5,148,730 A * | 9/1992 | McCaw | B23Q 9/0042 33/403 |
| 5,647,420 A * | 7/1997 | Michell | B23D 59/007 144/253.1 |
| 6,694,635 B1 * | 2/2004 | Sidebottom | B23Q 9/005 33/423 |
| 6,926,477 B2 * | 8/2005 | Allemann | B23C 5/10 144/136.95 |
| 6,966,122 B2 * | 11/2005 | Smith | B23Q 11/0046 144/136.95 |
| 7,086,171 B2 | 8/2006 | Lawson | |
| 7,367,131 B1 * | 5/2008 | Hordis | H02G 3/12 174/58 |
| 7,454,844 B1 * | 11/2008 | Ruby | B25H 7/02 30/358 |
| 7,958,641 B1 * | 6/2011 | Ende | B27B 9/02 30/376 |
| 9,140,435 B2 * | 9/2015 | Yaphe | F21V 21/00 |
| 2002/0134213 A1 | 9/2002 | Causse et al. | |
| 2005/0081954 A1 * | 4/2005 | Wielechowski | B27C 5/10 144/136.95 |
| 2014/0366386 A1 * | 12/2014 | Brisson | F24F 13/0245 30/273 |

* cited by examiner

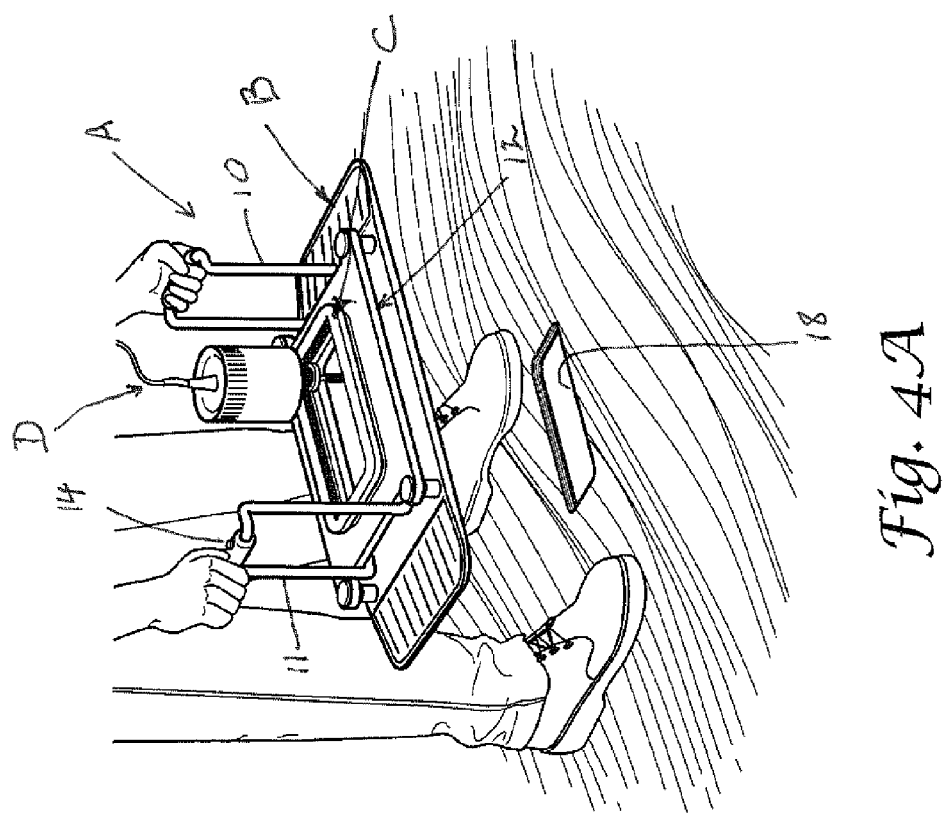
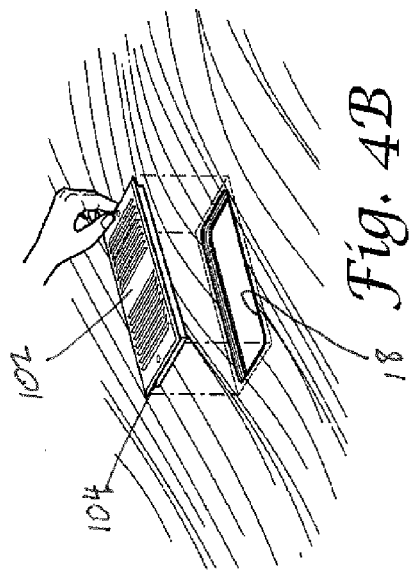
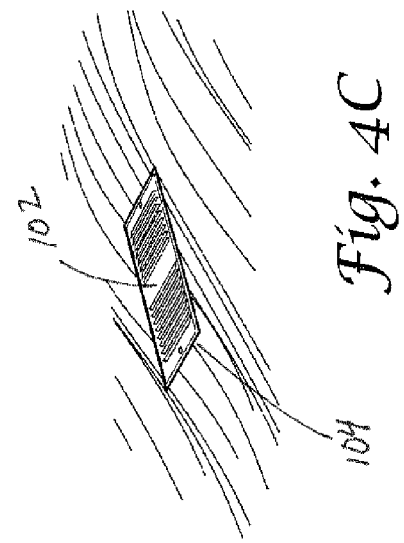

CUTTING TOOL ASSEMBLY FOR HVAC VENT OPENING AND THE LIKE

BACKGROUND OF THE INVENTION

The invention relates to a cutting tool for cutting openings for register vents in flooring or walls when installing a HAVC system and the like wherein the cutting tool automatically follows a track corresponding to the pattern for the vent opening.

In the installation of heating and air-conditioning systems (HAVC) numerous vent openings must be formed in floors, walls, or ceilings to connect the ductwork to the room. During new home construction, 20 or more vent openings may be needed, and other constructions require even more openings. Previously, the vent openings have been cut manually by using a power sabre saw or sawsall, and much physical labor is exerted on hands or knees. In order to cut the vent opening in the correct space in the floor, one must crawl under the house, locate a space for the vent opening between two floor joists, and drill a pilot hole in the floor while underneath the house to indicate the location. Using the pilot hole, a drawing of the vent opening is marked on the interior floor and the vent opening is manually cut out.

Prior attempts to provide tools and methods for cutting out vent openings for HAVC systems and the like using various floor guides have been made. For example U.S. Pat. No. 7,086,171 B2 discloses a template for cutting out vents of an HVAC system. U.S. Published Application no. 2002/0134213 discloses a cutter guide for guiding the movement of a cutting tool manually. These devices only disclose a guide with which a separate manual cutting tool is used. U.S. Pat. Nos. 4,620,407 and 4,359,302 disclose guides for cutting patterns out of sheet rock and the like. Thus, it can be seen that a power cutting tool is needed in the HAVC industry for cutting vent openings automatically in prescribed pattern.

SUMMARY OF THE INVENTION

The above objectives are accomplished according to the present invention by providing a power cutting tool for automatically cutting out a vent opening in a substrate such as a floor and the like in a prescribed pattern. The power cutting tool includes a base assembly adapted for support on a surface of a substrate while the vent opening is cut out. A track assembly is carried by the base assembly for automatically guiding the movement of the cutting tool in the pattern. A power cutting tool assembly is carried on the track assembly having a cutting blade which penetrates the substrate during operation to cut out the pattern. A drive assembly engages the track assembly for automatically moving the cutting tool assembly along the track assembly while simultaneously operating the cutting blade to cut out the vent opening. The cutting blade may include a rotating cutting blade or a reciprocating cutting blade. The drive assembly includes a first drive for operating the cutting tool and a second drive for moving the cutting tool assembly along the track assembly so that the cutting blade cuts out the pattern. In the case of the rotating cutting blade, the first drive includes a drive motor having a rotating driveshaft operatively connected to the cutting blade, and the second drive includes a tractor drive driven by the driveshaft having at least one tractor drive gear which engages the track assembly. Preferably, the tractor drive includes a first tractor drive gear and a second tractor by drive gear, and the track assembly includes a track having an exterior rack gear and an interior rack gear wherein the first tractor drive gear engages the interior rack gear and the second tractor drive gear engaging the exterior rack gear. A reduction gear arrangement is connected between the driveshaft and the tractor drive gears and includes a main output gear carried by the driveshaft. In a preferred form, the reduction gear arrangement includes a planetary gear drive having a first plurality of intermediary gears driven by the main output gear for driving the first tractor drive gear, and a second plurality of intermediary gears driven by the main output gear for driving the second tractor drive gear. The first plurality of intermediary gears may include a first planetary gear engaging a first ring gear for driving the first tractor drive gear, and the second plurality of intermediary gears may include a second planetary gear engaging a second ring gear for driving the second tractor drive gear wherein the first and second tractor drive gears mesh with the exterior and interior rack gears of the track, respectively, and rotate generally at the same speed in opposite directions. Advantageously, the power cutting tool includes a carriage frame that may be two pieces or one piece with the base assembly. The track assembly is carried by the carriage frame. In the case of a two-piece construction, the carriage frame is movable up-and-down. When the carriage frame is movable, the cutting blade cuts out the vent pattern when the carriage frame is in a down position over a pilot hole. For this purpose, a bias mechanism is connected between the base assembly and the carriage frame. The carriage frame may be moved downward to overcome the bias mechanism and reach the down operational position wherein the cutting blade can begin operating.

DESCRIPTION OF THE DRAWINGS

The invention will be more readily understood from a reading of the following specification and by reference to the accompanying drawings forming a part thereof, wherein an example of the invention is shown and wherein:

FIG. 4A is a front perspective view illustrating a worker using the power cutting tool of the invention to cut a vent and register opening in the floor;

FIGS. 4B and 4C illustrate the attachment of a vent register in the vent opening.

DESCRIPTION OF A PREFERRED EMBODIMENT

Figure 1:
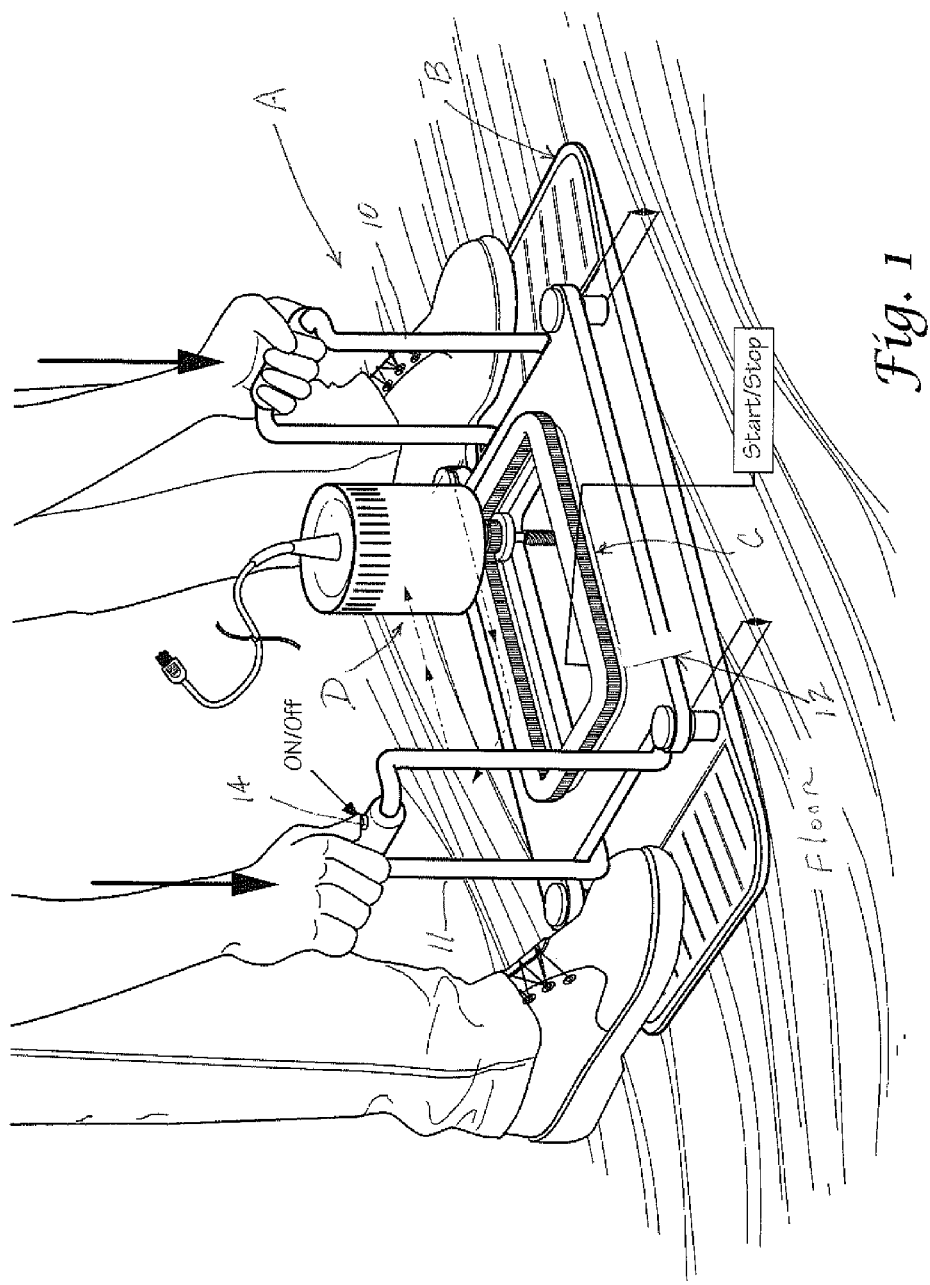
FIG. 1 is a front perspective view illustrating a power cutting tool according to the present invention for cutting out vent openings wherein the tool is in an operating position.

Referring now to the drawings, the invention will be described in more detail.

According to the present invention, a vent register cutting tool, designated generally as A, includes a base assembly B, a track assembly C, and a cutting tool assembly D. Base assembly B provides a carriage by which a cutting tool assembly D is carried on track assembly C.

Figure 2:
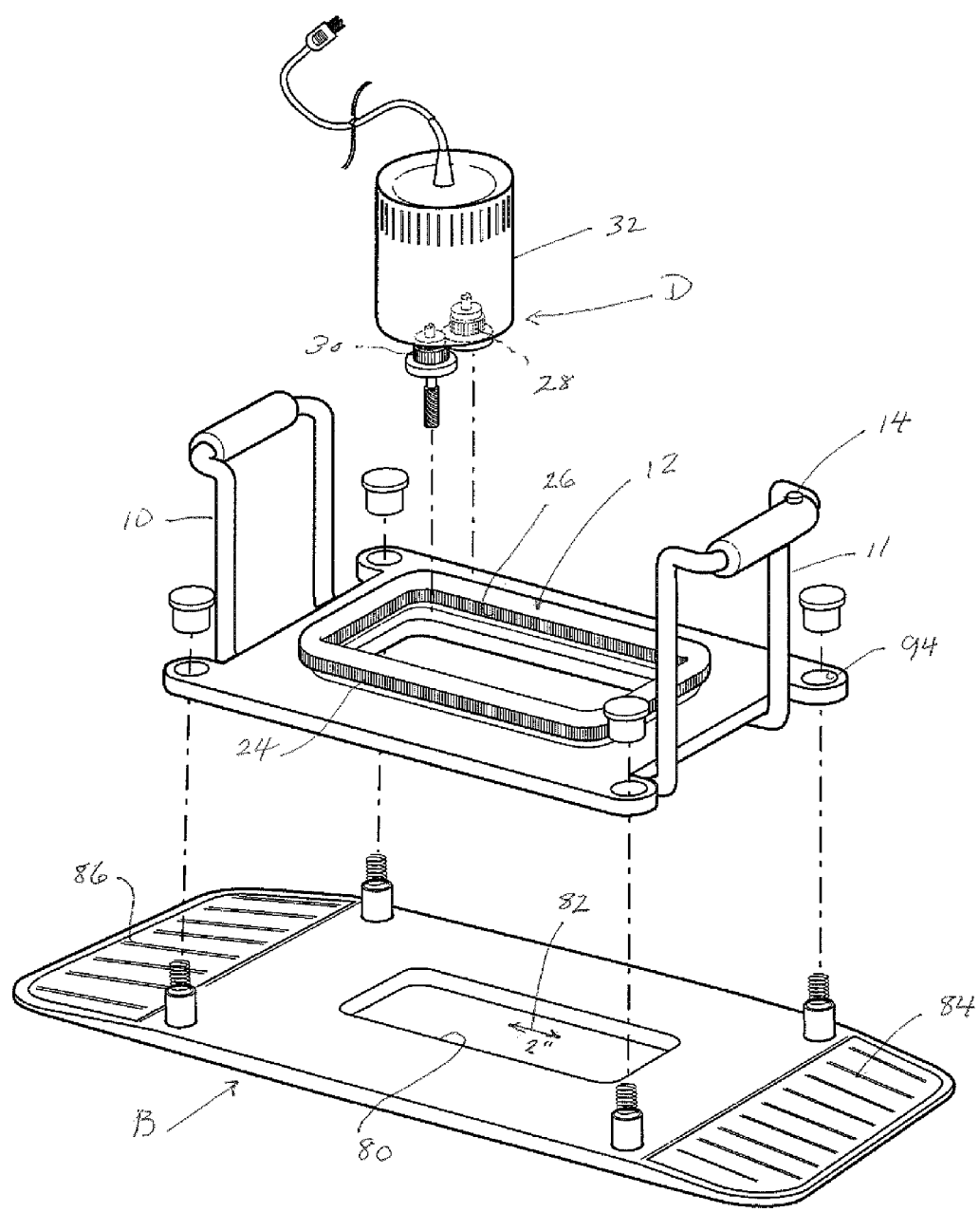
FIG. 2 is a front perspective view of a cutting tool according to the invention with parts exploded to illustrate the various constructions of the inventions.

As can best be seen in FIG. 2, base assembly B includes handles 10 and 11 carried by carriage frame 12. A cutting tool control switch 14 is carried on handle 11 to control the operation of a cutting tool 16 as it operates to cut out a vent opening 18.

Track assembly C includes a continuous track 20 carried by base B and carriage frame 12. There are typically two standard register vent sizes, 4"×8" and 4"×10". Track 20 provides a pattern for the 4"×8" vent opening. Track 20 provides a pattern for cutting out a 4"×10" opening by shifting the base 2 inches to the left or right and so that one continues cutting until another 2 inches is removed. Alternately two tracks may be replaceably used on carriage 12. Track 20 includes a rack gear 24 formed around the outside of the track and a second rack gear 26 formed around the inside of the track. Tractor drive gears 28 and 30 engage the outside and inside rack gears 24 and 26, respectively, to move the tool cutting assembly around the pattern of the track, as will be explained in more detail below.

Figure 3A:
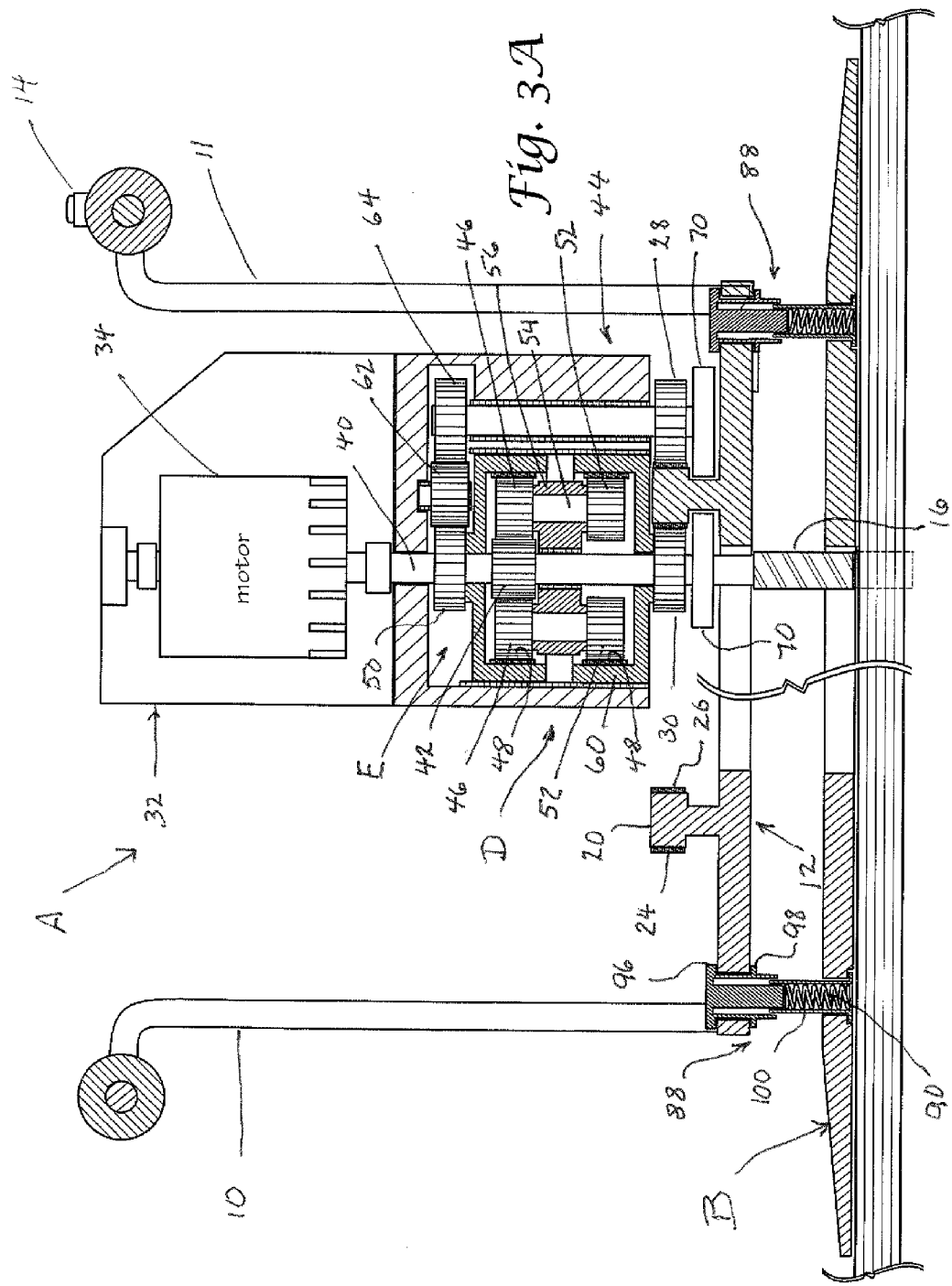
FIG. 3A is a front sectional view of a power cutting tool showing the drive for the center cutting blade and tractor wheels for moving the cutting blade along a prescribed path.
Figure 3B:
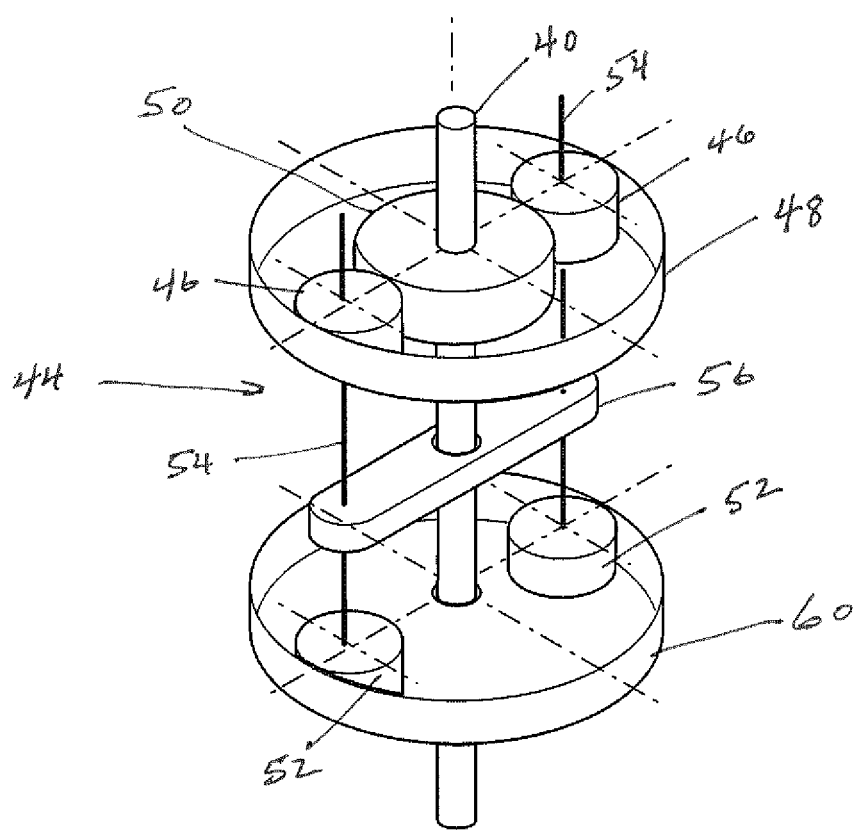
FIG. 3B is a perspective view of one embodiment of a planetary gear system that may be positioned within the gear box of a cutting tool, in accordance with one aspect of the present invention.

Cutting tool assembly D travels on track 20 to cut out vent opening 16. The assembly includes a housing 32 for a drive motor 34 and a reduction gear drive, designated generally as E, driven by the motor. The cutting tool 16 requires a high speed, while the cutting tool assembly requires a relatively low speed. As can best be seen in FIGS. 3A-3B, reduction gear drive E may include a planetary gear drive 44 which is compact and provides a speed reduction to drive two tractor gears 28 and 30 located on opposing sides of track 20 to move cutting tool assembly A around the track. The tractor gears negotiate the curves on the track and provide the use of a single motor for every drive. The illustrated gear box arrangement is one feasible combination, and others could be found having been taught the present invention.

For this purpose, planetary gear drive 44 may include a rotary driveshaft 40 driven by motor 34. A sun or input gear 42 is affixed to rotary shaft 40 to drive the planetary gear drive. Gear 42 engages planetary gears 46. Only one planetary gear 46 is needed for kinematic purposes, however, using redundant gears permits load sharing and the transmission of high power by using smaller gears. Planetary gears 46 engage both input drive gear 42 and a first ring gear 48 integral with drive gear 50. Gear 50 is a first output of the planetary gear drive. Planetary gears 46 and 52 rotate as a unit and are the planet gears of the system. Shafts 54 pass through a planet gear carrier arm 56, and are connected to opposing planetary gears 46 and 52. Gears 52 engage a second ring gear 60 which is integral with tractor drive gear 30 which is a second output of the planetary drive. Second ring gear 60 is integral with tractor drive gear 30. Tractor drive gear 30 engages inside gear rack 26 of track 20 as part of the tractor drive moving the power cutting tool around the track. Gear 50, through intermediate gears 62, 64, drives tractor drive gear 28 which engages the outside rack gear 24 of track 20. Synthetic guide rollers 70 are sandwiched under opposing flanges 25 of the "T" shaped track for stability and wear. As can best be seen in FIG. 3A, the "T" shaped track includes a vertical flange 20a and a horizontal flange having arms 20b that extend beyond the vertical flange whereby the guide rollers are fitted underneath the arms to provide stability for the tractor drive. The track 20 imposes a kinematic constraint on the outputs of gears 50 and 30, and ensures that the motion of the assembly around the track is determinate. The absolute speech speeds of gear 50 and 30 must change as the assembly negotiates the curves of the track. The relative speed of gears 50 and 30 are fixed by the planetary system. While the relative speeds do not change, the absolute speeds are forced by the added constraint of the track geometry to accommodate the curves. Positive engagement of the gears and the track are maintained even as the absolute speeds change.

The different gears described above may be selected in a conventional manner having been taught the aspects of the invention. For example, gear 42 may have 30 teeth. The ratio of gear 42 to gear 48 is 2094. The difference between the speeds of gears 28 and 30 is constant for a router operating at the speeds of 20,000 RPM; this difference will be about 9.5 RPM. Gears 28 and 30 turn in opposite directions therefore on a straight section of the track each will turn at about 4.75 RPM. The actual linear speed of the cutting tool assembly can be governed by selecting the size and teeth of the gears in a conventional manner. For example, gear 42 may have 30 teeth, gear 46 may have 39, gear 53 may have 38 teeth, ring gear 48 (internal gear) may have 108 teeth, ring gear 60 (internal gear) may have 105 teeth, gears 50 and 64 may be any suitable gears with the same number of teeth, gears 28 and 30 may be any suitable gears with the same number of teeth, and gear 62 may be selected to suit the remaining gear selection.

As can best be seen in FIGS. 1 and 2, base B and carriage floor 12 include a rectangular opening 80 which corresponds generally to the pattern 18 of the vent opening to be cut. As noted above, the opening 80 may be sized to cut out a 4"×8" vent opening. If a 4"×10" vent opening is desired, the base may be shifted to the left or right as indicated by arrow 82 by a distance of 2", and the cutting resumed. Opposing foot plates 84 and 86 are provided for the feet or knees of a worker for operating the power cutting tool. As can best be seen in FIG. 2, a biasing mechanism 88 permitting movement of the carriage frame 12 up-and-down is shown in the form of a biasing member in the form of a compression spring 90, and a biased member 92 in the form of a spring loaded piston. A piston cap 9 is fixed with carriage plate 12 by means of upper flange 96 and lower flange 98, and retains spring 90. The spring is fixed in a cylinder 100 which is fixed with base B. When the carriage frame is pushed down, the springs are compressed and the cutting tool 16 can penetrate and cut through the floor anywhere from 1 inch to 2 inches. The routing cutting blade may be started in pilot hole 106 (FIG. 5A) which is drilled from underneath the floor to locate the vent to begin with, or started anywhere else on the floor. Thus, in operation the worker will stand on base plate B pushing the cutting tool in contact with the floor. The worker will plunge the cutting tool in the floor, or other substrate and push button 14 turning on the cutting tool and the tractor drive. Even if the cutting tool does not penetrate the entire floor upon starting, the tool will eventually cut through the floor, go around the track until it comes to the remaining material, and then cut out the remaining material left upon startup.

Figure 5:
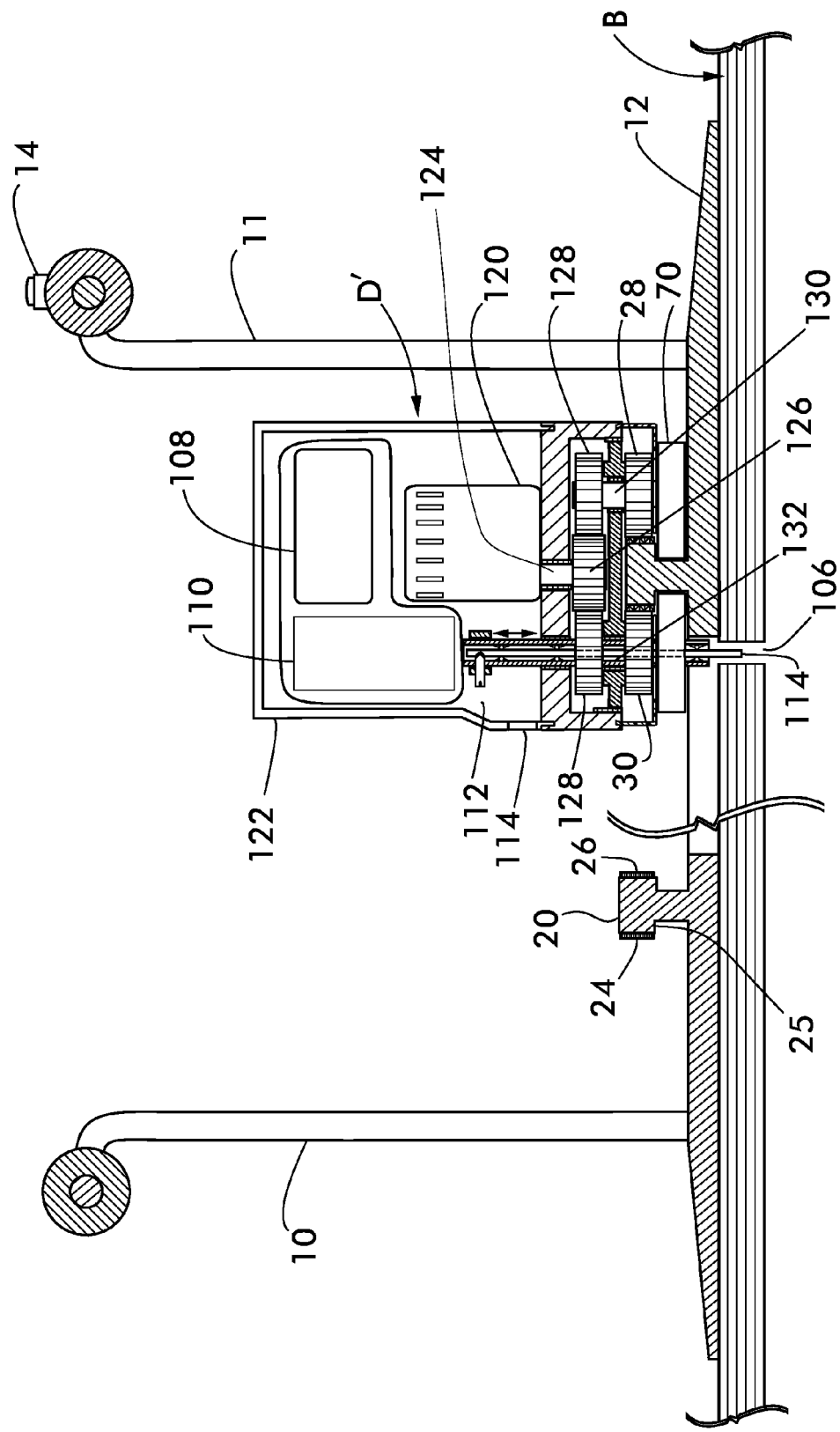
FIG. 5 is an elevation view showing another embodiment of the invention.

FIG. 5, illustrates another embodiment of the invention wherein a reciprocating saw blade is used as the cutting blade, rather than a rotating blade. In this embodiment, carriage 12 and face B are one piece. As in the previous embodiment, track assembly C includes a track 20 upon which a cutting tool assembly D' travels to cut out the vent opening pattern. In this case, the cutting tool assembly D' includes a reciprocating saw arrangement, designated generally as F having a motor 108 operatively connected to a suitable reciprocating saw mechanism 109, such as used in the typical saber saw. A blade release mechanism 112 is provided to change the saw blade to an opening 114 in which a screwdriver or other tool may be inserted to loosen a blade lock and exchange a blade. A track motor 120 is carried in the housing 122 of the cutting tool assembly. Tractor motor 120 includes a rotating drive shaft 124 which rotates a drive gear 126 meshing with gears 128 on either side of the track. Gears 128 drive tractor gears 28 and 30 whereby the gears of the tractor gears mesh with the rack gears of the track to move the tool cutting assembly around the pattern to effect cutting of the vent opening. Shafts 130 and 132 connect the respective output gears and tractor drives. Again, in operation, the saw blade 114 is first located in pilot hole 108 extending through the floor which has been used to mark the location of the vent opening from underneath the house. Push button 14 is pushed in and the saw blade begins reciprocating while the tractor drive moves the cutting blade around the track. Alternately, a planetary gear drive may be operatively connected between motor output 124 and the tractor drive gears 128 and 130, as described in the first embodiment.

Referring now to FIGS. 4A, 4B, and 4C, upon completion of cutting out vent opening 18, the worker releases the start button 14 and lifts the power cutting tool assembly off of the floor. Next, the floor register 102 is fitted into the vent opening. The floor register includes a flange 104 about its periphery which overlies and covers the edges of the vent opening.

While the preferred embodiment of the invention has been described using specific terms, such description is for illustrative purposed only, and it is to be understood that changes and variations may be made without departing from the spirit or scope of the following claims.

What is claimed is:

1. A power cutting tool for automatically cutting out a vent opening in a substrate such as a floor and the like according to a prescribed pattern comprising:
   a base assembly adapted for support on a surface of a floor while the vent opening is cut out within a pattern in said base assembly;
   a track assembly carried by the base assembly for automatically guiding the movement of a cutting tool;
   a power cutting tool assembly carried on the track assembly having a cutting tool assembly including a cutting blade which penetrates the floor during operation; and
   a drive assembly engaging said track assembly for automatically moving said cutting tool assembly along said track assembly while simultaneously driving said cutting blade to cut out said vent opening pattern in said floor.

2. The apparatus of claim 1 wherein said track assembly includes at least one track corresponding to the pattern of said vent opening.

3. The apparatus of claim 2 wherein said cutting tool assembly includes a housing, at least a part of said drive assembly being carried in said housing for moving said housing and cutting tool assembly along said track assembly.

4. The apparatus of claim 2 wherein said cutting blade includes a rotating cutting blade, and said drive assembly includes a first drive for rotating said cutting tool and a second drive for moving said cutting tool assembly along said one track so that the rotating cutting blade cuts out the pattern.

5. The apparatus of claim 4 wherein said first drive includes a drive motor having a driveshaft operatively connected to said cutting blade, and said second drive includes a tractor drive driven by said driveshaft having at least one tractor drive gear which engages said one track.

6. The apparatus of claim 5 wherein said tractor drive includes a first tractor drive gear and a second tractor by drive gear, said one track including an exterior rack gear and an interior rack gear, said first tractor drive gear engaging said interior rack gear and said second tractor drive gear engaging said exterior rack gear.

7. The apparatus of claim 6 including a reduction gear arrangement connected between said driveshaft and said tractor drive gears; said reduction gear arrangement including a main output gear rotatably carried by said driveshaft, a first plurality of intermediary gears driven by said main output gear for driving said first tractor drive gear, and a second plurality of intermediary gears driven by said main output gear for driving said second tractor drive gear.

8. The apparatus of claim 7 wherein said first plurality of intermediary gears includes a first planetary gear engaging a first ring gear for driving said first tractor drive gear, and said second plurality of intermediary gears includes a second planetary gear engaging a second ring gear for driving said second tractor drive gear, said first and second tractor drive gear gears meshing with exterior and interior rack gears of said track assembly, respectively, and rotate generally at the same speed in opposite directions.

9. The apparatus of claim 4 including a main output gear affixed to said driveshaft, said second drive including a planetary gear train connected to said main output gear, said planetary gear train having a first output and a second output, said tractor drive including a first tractor drive gear and a second tractor drive gear, said first output being operatively connected to said first tractor drive gear, and said second output being operatively connected to said second drive gear wherein said first and second drive gears engage said one track to move said tool cutting assembly along the track.

10. The apparatus of claim 9 wherein said planetary gear train includes at least a first planetary gear meshing with a first ring gear, said first output of said planetary gear train being driven by said first ring gear, said planetary gear train including a least a second planetary gear driven by said main output gear which meshes with a second gear ring to drive said second output of said planetary gear train, a planetary gear arm rotatably journaled on said driveshaft having a shaft opening, and a shaft extending through said drive opening which is affixed to said first planetary gear and said second planetary gear whereby said first and second planetary gears are rotated about said driveshaft while said first and second outputs drive said first and second tractor drive gears, respectively.

11. The apparatus of claim 10 wherein said first ring gear drives said first output, a first intermediary gear, and intermediary gear driveshaft, and said first tractor drive gear being driven by said first intermediary shaft.

12. The apparatus of claim 11 wherein said second ring gear provides said second output which defines said second tractor drive gear.

13. The apparatus of claim 10 wherein said first planetary drive includes a first pair of planetary gears driven by said main output gear, said second planetary drive includes a second pair of planetary gears, and said carrier arm rotatably journaled on said driveshaft rotates said first and second pair of planetary gears while they are mashed with said first and second gear ring, respectively.

14. The apparatus of claim 2 wherein said cutting blade includes a reciprocating cutting blade, and said drive assembly includes a first drive for reciprocating said cutting blade, and a second drive for moving said cutting tool assembly along said track to cut out said vent hole pattern.

15. The apparatus of claim 14 wherein said drive assembly includes a tractor drive having a first tractor drive gear and a second tractor by drive gear, said one track including an exterior rack gear and an interior rack gear, said first tractor drive gear engaging said interior rack gear and said second tractor drive gear engaging said exterior rack gear.

16. The apparatus of claim 15 wherein said second drive includes a drive motor, a reduction gear arrangement connected between said driveshaft and said first and second tractor drive gears.

17. The apparatus of claim 1 including a bias mechanism connected between said base assembly and carriage frame urging said carriage frame upwards to an nonoperational positional wherein said carriage frame may be moved downward to overcome said bias mechanism and reach an operational position, and said cutting blade being in an operating position relative to said floor surface.

18. The apparatus of claim 17 including a pair upwardly extending handles carried by said carriage frame for moving said carriage downwardly to overcome said biasing mechanism.

19. The apparatus of claim 17 wherein said bias mechanism includes a biasing member urging said carriage frame away from said base, and a biased member which is overcome by a downward movement of said carriage frame, and said biasing member returning said carriage frame to said nonoperational position.

20. The apparatus of claim 17 wherein each handle each handle comprises a pair of standing arms, a handle grip each pair of upstanding arms integral with carriage frame, and a power switch carried on one of said handles to turn said first and second drives off and on.

21. The apparatus of claim 1 including a power switch carried on one of said handles for turning said drive assembly off and on.

22. A power cutting tool for automatically cutting out a vent opening in a substrate such as a floor and the like according to a prescribed pattern comprising:
  a base assembly adapted for support on a surface of said substrate while the vent opening is cut out in a pattern;
  a track assembly having a track carried by the base assembly for automatically guiding the movement of a cutting tool assembly;
  a power cutting tool assembly carried on the track including a cutting blade which penetrates the substrate during operation to cut out said vent opening and said pattern;
  a drive assembly having a first drive for operating said cutting blade, and a second drive engaging said track for automatically moving said cutting tool assembly along said track assembly while simultaneously driving said cutting blade to cut out said vent opening pattern in said floor;
  said second drive including a first tractor drive gear and a second tractor drive gear, and said first and second tractor drive gears engaging opposite sides of said track.

23. The apparatus of claim 22 wherein said drive assembly includes a driveshaft having a main output gear, said second drive including a planetary gear train connected to said main output gear, said planetary gear train having a first output and a second output, said first output being operatively connected to said first tractor drive gear, and said second output being operatively connected to said second drive gear wherein said first and second tractor drive gears engage said track to move said tool cutting assembly along the track.

24. The apparatus of claim 23 wherein said track includes a vertical flange, a horizontal flange having arms extending over said vertical flange, a first rack gear carried on one side of said vertical flange and a second rack gear carried on opposing side of said vertical flange wherein said first tractor gear engages said first rack gear and said second tractor drive gear engages said second rack gear.

25. The apparatus of claim 22 wherein said cutting blade is a rotary cutting blade.

26. The apparatus of claim 22 wherein said cutting blade is a reciprocating cutting blade.

27. A power tool for cutting a vent opening in a substrate such as a floor and the like comprising:
  a base assembly;
  a track carried by said base assembly having an interior rack gear and an exterior rack gear;
  a tractor drive having a first tractor drive gear meshing with said exterior rack gear and a second tractor drive gear meshing with said interior rack gear of said track;
  a power cutting tool carried on the track and moved along the track by means of said tractor drive; and
  said power cutting tool including a cutting tool, and a drive motor for operating said cutting tool to cut an opening in said substrate corresponding to said vent opening while the tractor drive moves the power cutting tool on the track.

28. The apparatus of claim 27 including at least one handle for holding the power tool in place as said vent opening is cut.

29. The apparatus of claim 28 including a carriage frame carried for up-and-down movement relative to said base assembly, said at least one handle carried by said carriage frame to urge said carriage frame downward to a cutting position and lifting said carriage frame upward to a non-cutting position.

30. The apparatus of claim 27 including a gear reduction drive connected between said drive motor and said tractor drive.

* * * * *